(12) United States Patent
Chen

(10) Patent No.: US 9,489,319 B1
(45) Date of Patent: Nov. 8, 2016

(54) OPERATING TIME SUPERVISORY SYSTEM

(71) Applicant: Primax Electronics Ltd., Neihu, Taipei (TW)

(72) Inventor: Hung-Sheng Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 14/867,296

(22) Filed: Sep. 28, 2015

(30) Foreign Application Priority Data

Jun. 18, 2015 (TW) .............................. 104119785 A

(51) Int. Cl.
| | |
|---|---|
| *G06F 3/00* | (2006.01) |
| *G06F 13/10* | (2006.01) |
| *G06F 11/30* | (2006.01) |
| *G06F 9/44* | (2006.01) |
| *G06F 17/21* | (2006.01) |

(52) U.S. Cl.
CPC ........... *G06F 13/102* (2013.01); *G06F 9/4411* (2013.01); *G06F 11/302* (2013.01); *G06F 11/3055* (2013.01); *G06F 17/212* (2013.01)

(58) Field of Classification Search
CPC .......................... G06F 9/4411; G06F 17/212
USPC .................................. 719/321, 322; 715/273
See application file for complete search history.

(56) References Cited

U.S. PATENT DOCUMENTS

| | | | | |
|---|---|---|---|---|
| 6,966,002 | B1 * | 11/2005 | Torrubia-Saez | ........ G06F 21/10 |
| | | | | 705/51 |
| 9,158,461 | B1 * | 10/2015 | Lee | .......................... G06F 3/061 |
| 2009/0303515 | A1 * | 12/2009 | Imai | ..................... G06F 3/1204 |
| | | | | 358/1.13 |
| 2014/0088734 | A1 * | 3/2014 | Narutani | ................ G05B 19/05 |
| | | | | 700/28 |

OTHER PUBLICATIONS

David B. Stewart, The Chimera II Real-Time Operating System for Advanced Sensor-Based Control Applications, Jan. 26, 1991.*

* cited by examiner

*Primary Examiner* — Lechi Truong
(74) *Attorney, Agent, or Firm* — Kirton McConkie; Evan R. Witt

(57) ABSTRACT

An operating time supervisory system includes a computer host, a computer screen and an input device. An application program and a device driver corresponding to the input device are installed in the computer host. The device driver contains a supervisory program. When the application program is opened, the supervisory program recognizes the application program and starts to calculate an operating time of the application program. After a prompt setting task is completed, the supervisory program acquires a prompt time point. If the supervisory program judges that the application program is still operated at the prompt time point, the operating time corresponding to the prompt time point is displayed on the computer screen under control of the supervisory program.

10 Claims, 7 Drawing Sheets

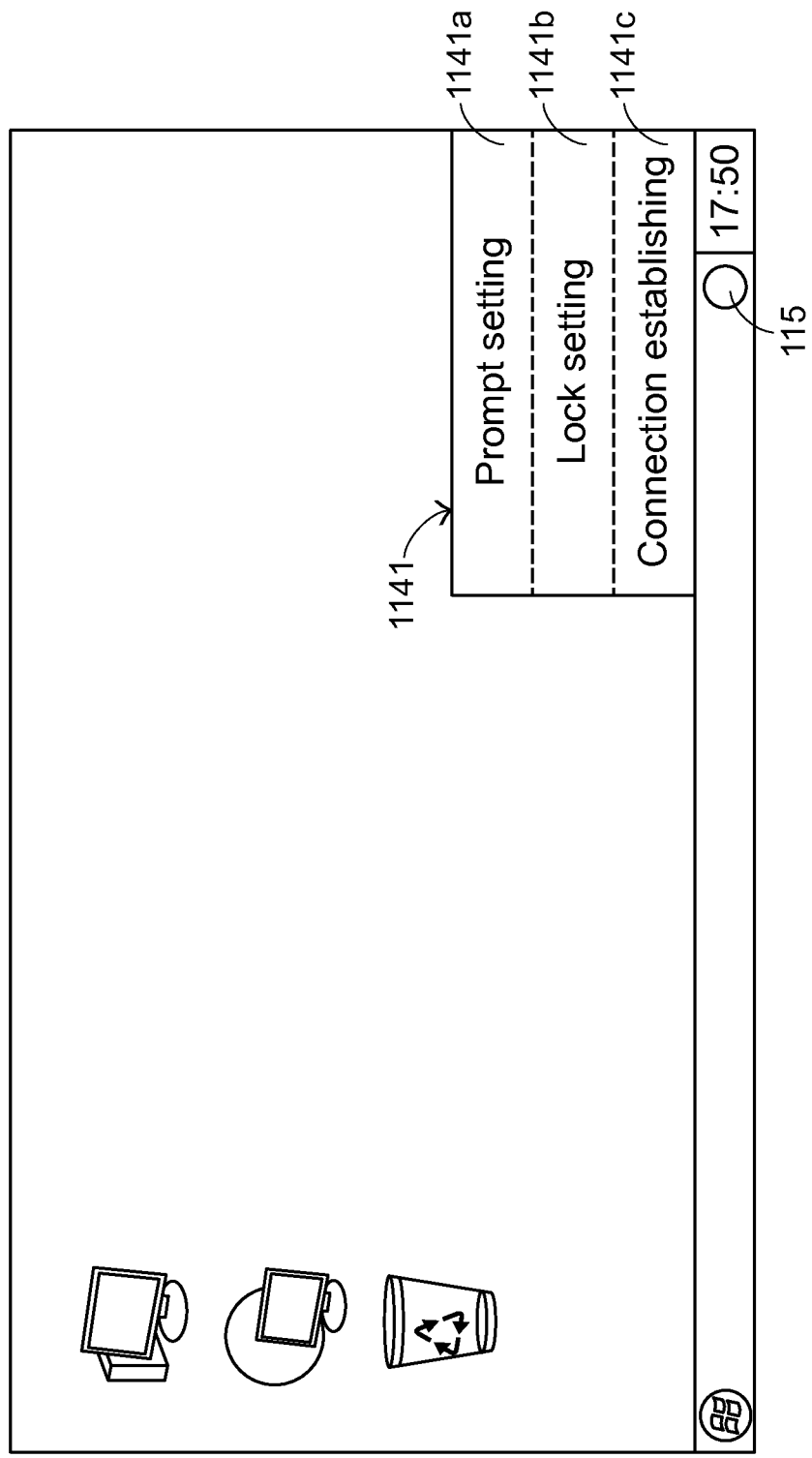

OPERATING TIME SUPERVISORY SYSTEM

FIELD OF THE INVENTION

The present invention relates to an operating time supervisory system, and more particularly to an operating time supervisory system for an input device.

BACKGROUND OF THE INVENTION

With increasing development of science and technology, electronic devices become more and more popular to personal users. The widely-used electronic devices include for example computer hosts, notebook computers, smart phones, tablet computers, or the like. Among these electronic devices, smart phones and tablet computers are touch sensitive electronic devices with many advantages such as small volume and portability. Consequently, the touch sensitive electronic devices are favored by many users. Generally, the user may operate the computer host and the notebook computer via an input device. For example, the notebook computer has a built-in keyboard module. The user may operate the smart phone, the tablet computer or any other touch sensitive electronic device by touching a touch screen with fingers. However, the performance of inputting characters or symbols through the touch screen is inferior to the input device. Consequently, the input devices with diversified functions have been introduced into the market. These input devices and the electronic devices (e.g., including the touch sensitive electronic devices) can be cooperatively used by the user.

The above electronic devices are popular to ordinary families. Moreover, the game application programs installed in the electronic device are often executed by many children of the families, so that the computer games can be played by them. If the children spend lot of time in playing computer games, the children may suffer from short-sightedness, and the time period of doing homework or reading books will be shortened. Consequently, parents desire to supervise the children about the time period of playing the computer games. Generally, the children are allowed to play game in a certain time segment. However, owing to carelessness of the parents, the children may play computer games overtime.

For solving the above drawbacks, a prompting device for preventing overtime use of a computer is disclosed in Taiwanese Utility Patent No. 410913 for example. A pressure sensor, a microcontroller with a timer and an alarm are installed in an input device of the computer. In this patent, the pressure sensor is used for detecting a direct pressure or an indirect pressure that is applied to the input device by the user's hand. According to the result of detecting the direct pressure or the indirect pressure, the microcontroller can judge whether the input device is being operated. When the pressure sensor detects the pressure applied by a hand, the timer starts to count time. If the microcontroller judges that the user or the child continuously applies the pressure for a certain time period, the microcontroller controls the alarm to generate vibration or emit warning sound so as to prompt the user to stop operating the computer.

However, the technology disclosed in Taiwanese Utility Patent No. 410913 is still unable to effectively limit the user to play the computer game or use the electronic device. For example, the child may self-change another input device without the prompting function in order to avoid the vibration or the warning sound that is generated by the alarm.

Therefore, there is a need of providing an operating time supervisory system for effectively supervising an operating time.

SUMMARY OF THE INVENTION

An object of the present invention provides an operating time supervisory system for effectively supervising an operating time.

In accordance with an aspect of the present invention, there is provided an operating time supervisory system. The operating time supervisory system includes a computer host, a computer screen and an input device. An application program and a device driver are installed in the computer host. The device driver contains a supervisory program. When the application program is opened in the computer host, the supervisory program recognizes the application program and starts to calculate an operating time of the application program. The computer screen is connected with the computer host. An operating picture of the computer host is displayed on the computer screen. The input device is connected with the computer host. After the input device is driven by the device driver, the computer host is controlled in response to a user's operation on the input device. If the supervisory program judges that the application program is still operated at a prompt time point, the operating time corresponding to the prompt time point is displayed on the computer screen under control of the supervisory program.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 2 schematically illustrates a supervisory setting option and a setting interface of the operating time supervisory system according to the embodiment of the present invention;

DETAILED DESCRIPTION OF THE PREFERRED EMBODIMENT

For overcoming the drawbacks of the conventional technologies, the present invention provides an operating time supervisory system.

Figure 1:
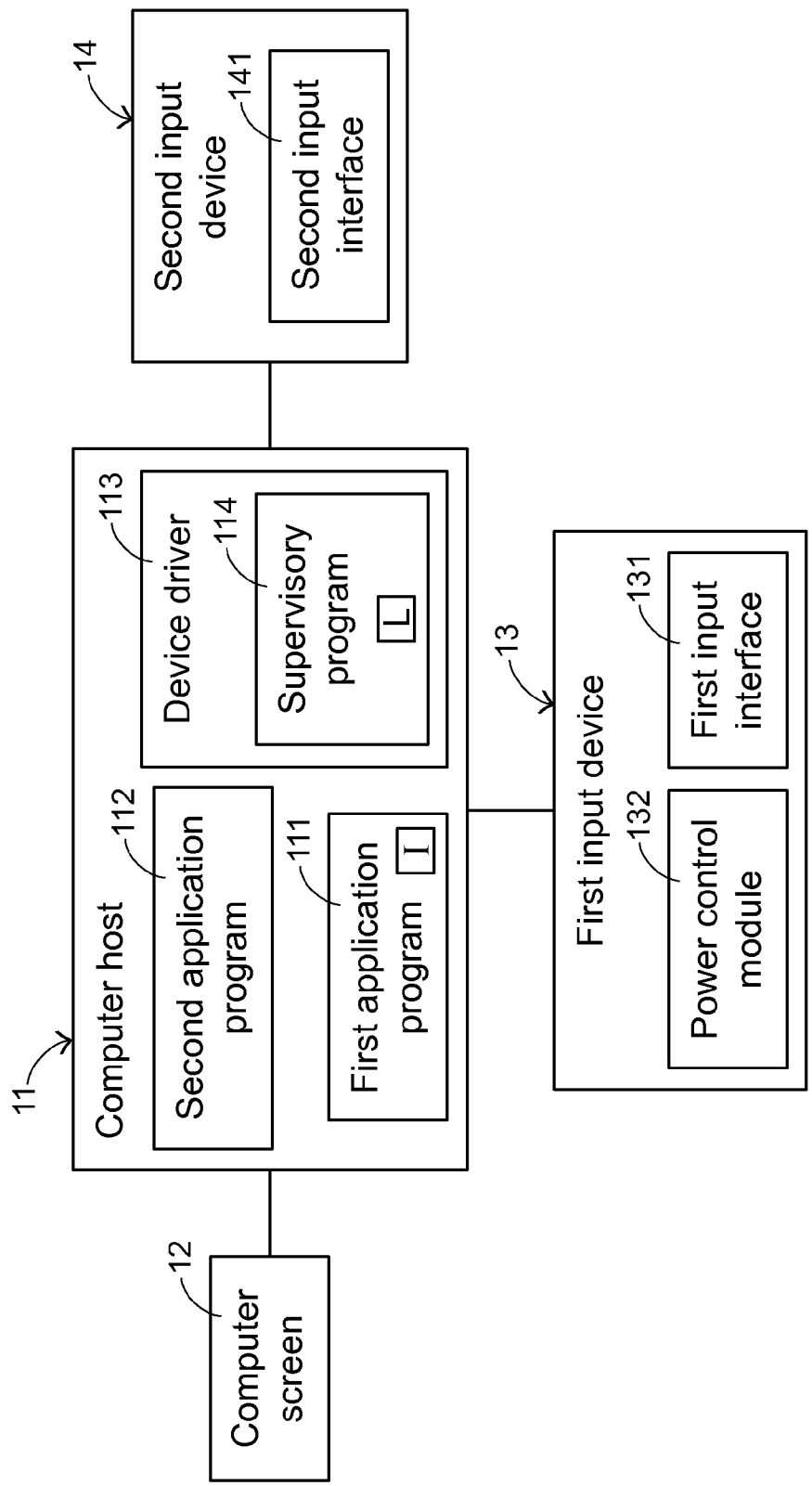
FIG. 1 is a schematic functional block diagram illustrating an operating time supervisory system according to an embodiment of the present invention.

Hereinafter, the architecture of an operating time supervisory system will be illustrated with reference to FIG. 1. FIG. 1 is a schematic functional block diagram illustrating an operating time supervisory system according to an embodiment of the present invention. As shown in FIG. 1, the operating time supervisory system 1 comprises a computer host 11, a computer screen 12, a first input device 13 and a second input device 14. A first application program 111, a second application program 112 and a device driver 113 corresponding to the first input device 13 are installed in the computer host 11. The device driver 113 contains a supervisory program 114. After the process of installing the device driver 113 in the computer host 11 is completed, the supervisory program 114 is created. When any application program in the computer host 11 is opened, the supervisory program 114 will recognize the application program. Moreover, if the supervisory program 114 judges that the application program has to be supervised, the supervisory program 114 starts to calculate the operating time of the application program. The computer screen 12 is connected with the computer host 11 for displaying the operating picture of the computer host 11. The operating picture of the computer host 11 contains the operating picture corresponding to the first application program 111 and the operating picture corresponding to the second application program 112. In an embodiment, the first application program 111 is a game program, and the second application program 112 is a word processing program.

As shown in FIG. 1, the first input device 13 is connected with the computer host 11. The first input device 13 is driven by the device driver 113. In response to the user's operation on the first input device 13, the computer host 11 is correspondingly controlled. The first input device 13 comprises a first input interface 131 and a power control module 132. The first input interface 131 is partially exposed outside the first input device 13. Consequently, when the first input interface 131 is touched and operated by the user, a corresponding first operating signal is transmitted to the computer host 11. According to the first operating signal, the computer host 11 implements a corresponding task. Through the connection between the first input device 13 and the computer host 11, the power control module 132 is in communication with the supervisory program 114. The power control module 132 is used for controlling whether electricity is transmitted to the first input interface 131 or not. The second input device 14 is connected with the computer host 11. Via the second input device 14, the user can set up associated supervisory settings through the supervisory program 114. The second input device 14 comprises a second input interface 141. The second input interface 141 is partially exposed outside the second input device 14. Consequently, when the second input interface 141 is touched and operated by the user, a corresponding second operating signal is transmitted to the computer host 11. According to the second operating signal, the computer host 11 implements a corresponding task. Furthermore, the second input device 14 has an unlocking function, which will be described later.

In this embodiment, the computer host 11 is a host of a desktop computer, the first input device 13 is a mouse device, and the second input device 14 is a keyboard device. The device driver 113 is provided by the manufacturer of the first input device 13. The device driver 113 can be stored in any storage medium (e.g., an optical disc). Through a corresponding storage medium reader (e.g., an optical disc drive), the device driver 113 is loaded to the computer host 11. Consequently, the device driver 113 is installed in the computer host 11. It is noted that numerous modifications and alterations may be made while retaining the teachings of the invention. For example, in another embodiment, the computer host, the computer screen and the second input device are combined together as a notebook computer, and the first input device and the second input device may be other kinds of input devices. Alternatively, the device driver is provided by the manufacturer of the first input device 13, and stored in a network server or a network space. Consequently, the computer host is in communication with the network server or the network space through network connection so as to acquire the device driver.

Please refer to FIG. 1 again. The first application program 111 contains an identification element I. The supervisory program 114 can recognize the first application program 111 through the identification element I. In contrast, the second application program 112 does not contain the identification element I. That is, the supervisory program 114 can recognize the first application program 111 but cannot recognize the second application program 112. In this embodiment, the recognized application program is the application program to be supervised by the supervisory program 114. In this embodiment, the identification element I is an identification code of the first application program 111, a program name of the first application program 111 or an installation path of the first application program 111 in the computer host 11.

Moreover, the manufacturer of the first input device 13 may collect statistics about the commercially-available applications programs with higher use frequencies, and previously store the identification elements of the higher use-frequency applications programs into a supervisory list L of the supervisory program 114. Take the first application program 111 as an example. After the supervisory program 114 is installed in the computer host 11, the first application program 111 is installed in the computer host 11. During the process of installing the first application program 111, the supervisory program 114 scans the first application program 111 and thus acquires the identification element I of the first application program 111. Consequently, the first application program 111 is recognized. In another words, the identification elements of the required application programs are added to the supervisory list L of the supervisory program 114 according to the practical requirements of the user. Consequently, the number of the application programs to be supervised is increased.

After the hardware components and the software components of the operating time supervisory system 1 are configured or installed, the operations of the operating time supervisory system 1 will be illustrated as follows. FIG. 2 schematically illustrates a supervisory setting option and a setting interface of the operating time supervisory system according to the embodiment of the present invention. Please refer to FIGS. 1 and 2. As mentioned above, after the device driver 113 is installed in the computer host 11, the supervisory program 114 is installed in the computer host 11. Consequently, a supervisory setting option 115 of the supervisory program 114 is displayed on the operating picture of the computer host 11. Through the supervisory setting option 115, the user may perform a prompt setting task, a lock setting task and a connection establishing task. When the user selects the supervisory setting option 115 via the first input interface 131 of the first input device 13, the computer host 11 activates the supervisory setting option 115. Consequently, a setting interface 1141 is shown by the supervisory program 114. The setting interface 1141 contains a prompt setting option 1141a, a lock setting option 1141b and a connection establishing setting option 1141c.

After the prompt setting option 1141a is activated, a prompt setting field 1142a (see FIG. 3A) is provided. The prompt setting field 1142a receives the occurrence time information of the event that is provided by the user. The event is an agendum to be proceeded by the user. The supervisory program 114 will prompt the user in a certain time period before the agendum occurs. Consequently, the agendum is not delayed. After the lock setting option 1141*b* is activated, a lock setting field 1142*b* (see FIG. 5A) is provided. The lock setting field 1142*b* receives an open time segment information that is provided by the user. Consequently, by the supervisory program 114, one or more specified application programs are not allowed to be activated during the locked time segments but only allowed to be activated during the open time segments. After the connection establishing setting option 1141*c* is activated, a connection establishing setting field 1142*c* (see FIG. 6) is provided. After connection establishing setting field 1142*c* receives the identification element of a specified application program, the specified application program is added to the supervisory list L of the supervisory program 114. Consequently, the specified application program can be recognized and supervised by the supervisory program 114.

Figure 3A:
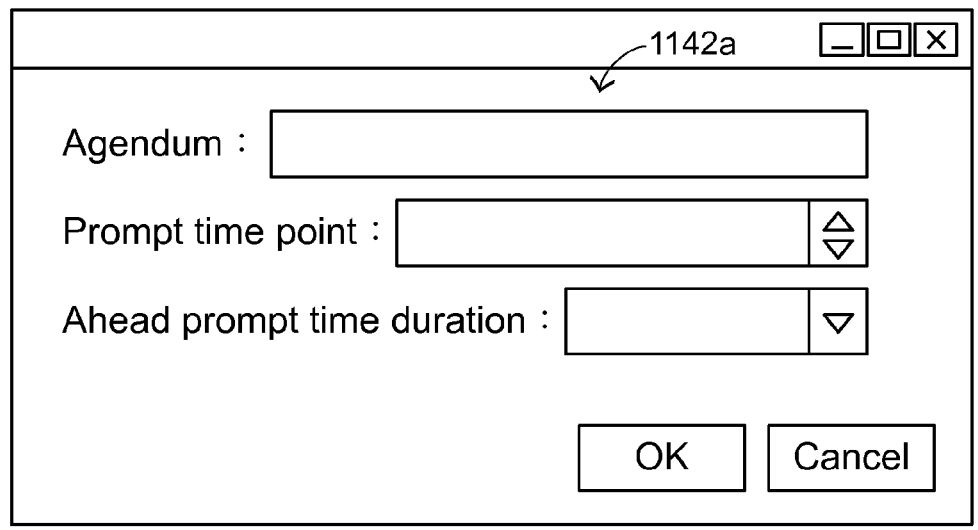
FIGS. 3A~3C schematically illustrate the prompt setting field of the operating time supervisory system according to the embodiment of the present invention.
Figure 3B:
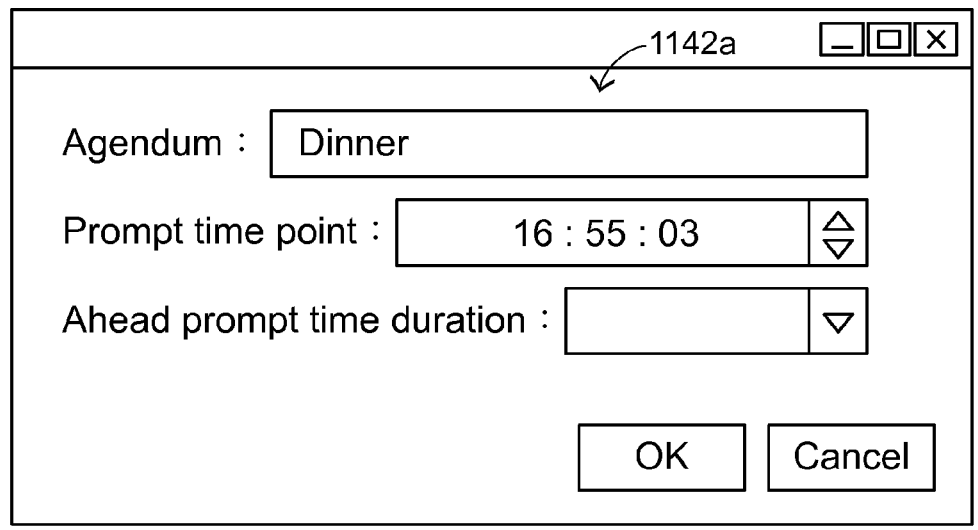
Figure 3C:
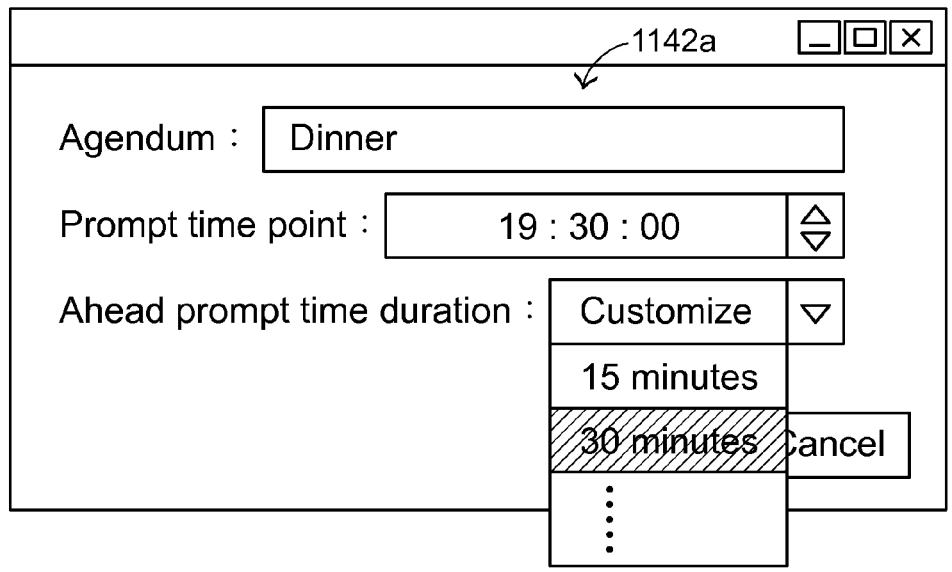

Hereinafter, a process of performing the prompt setting option by the supervisory program 114 will be illustrated with reference to FIGS. 1, 2, 3A, 3B and 3C. FIGS. 3A~3C schematically illustrate the prompt setting field of the operating time supervisory system according to the embodiment of the present invention. When the user selects the supervisory setting option 115 via the first input interface 131, the computer host 11 activates the supervisory setting option 115, so that the setting interface 1141 is shown by the supervisory program 114. After the user selects the prompt setting option 1141*a* of the setting interface 1141 via the first input interface 131, the prompt setting field 1142*a* is shown by the supervisory program 114. As shown in FIG. 3A, the prompt setting field 1142*a* contains an agendum field, an event occurrence time point filed and an ahead prompt time duration field. The agendum field receives the agendum content information that is provided by the user. For example, the agendum content information includes "Go out", "Have a meal", "Hold a meeting", and so on. The event occurrence time point filed receives the occurrence time point information of the agendum that is provided by the user. For example, the occurrence time point information of the agendum includes date and time. In FIG. 3B, only time is shown. It is noted that the event occurrence time point information received by the supervisory program 114 is not restricted to time. For succinctness, the date information is omitted. The ahead prompt time duration field receives at least one ahead prompt time duration information that is provided by the user. That is, the event occurrence time information contains the agendum content information, the occurrence time point information and the ahead prompt time duration information.

For example, the supervisory program 114 receives the agendum content information "Dinner" from the agendum field, receives the occurrence time point information "19:30" from the event occurrence time point filed, and receives the ahead prompt time duration information "15 minutes" and "30 minutes" from the ahead prompt time duration field. Since the occurrence time point information is "19:30" and the ahead prompt time duration information includes "15 minutes" and "30 minutes", the supervisory program 114 calculates and acquires two prompt time points after receiving the event occurrence time information. Meanwhile, the prompt setting task is completed.

Figure 4:
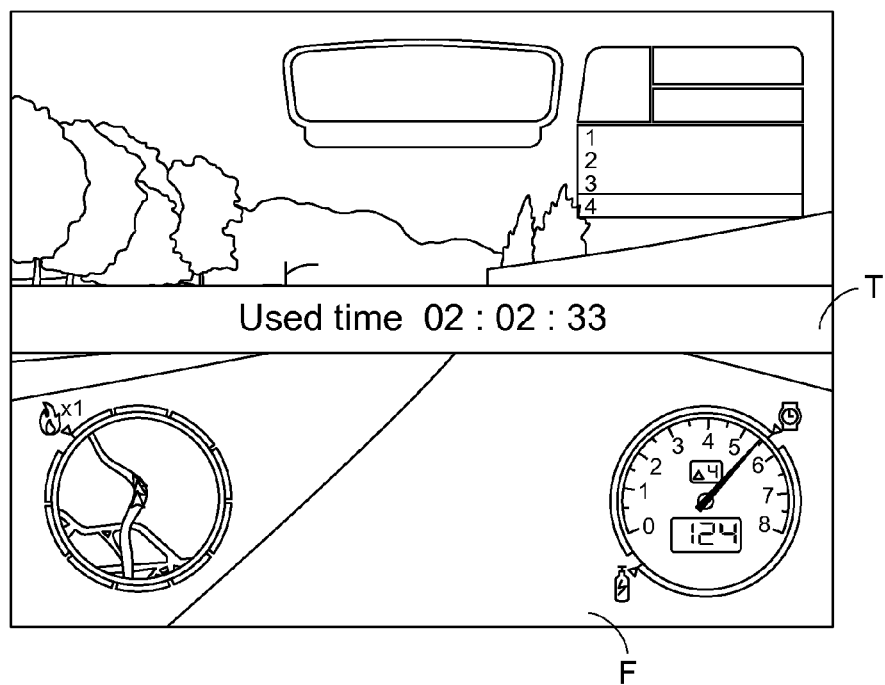
FIG. 4 schematically illustrating an operating time displayed on the computer screen of the operating time supervisory system according to the embodiment of the present invention.

Next, when the user operates the first input device 13 to open the first application program 111, the supervisory program 114 recognizes the first application program 111 according to the identification element I of the first application program 111 and detects that the first application program 111 is opened. Meanwhile, the supervisory program 114 starts to calculate the operating time of the first application program 111. If the supervisory program 114 judges that the first application program 111 is still operated at the first prompt time point (e.g., 19:00), the current operating time T is displayed on the computer screen 12 for a display prompt time interval under control of the supervisory program 114. Moreover, as shown in FIG. 4, the operating time T is positioned over a part of the operating picture F corresponding to the first application program 111. In this embodiment, the operating time T of the first application program 111 is positioned over a middle region of the operating picture F corresponding to the first application program 111. The operating time T positioned over the part of the operating picture F indicates that the operating time T of the first application program 111 is displayed on an overlying layer of the operating picture F corresponding to the first application program 111. Consequently, the operating picture F is a not shielded by the operating time T. In an embodiment, the display prompt time interval is about 3~5 seconds. After the display prompt time interval, the supervisory program 114 stops displaying the current operating time on the computer screen 12. If the supervisory program 114 judges that the first application program 111 is still operated at the second prompt time point (e.g., 19:15), the current operating time T is displayed on the computer screen 12 for the display prompt time interval under control of the supervisory program 114. Moreover, the operating time T is positioned over a part of the operating picture F corresponding to the first application program 111. Consequently, the supervisory program 114 prompts the used for the second time. The prompting function of the supervisory program 114 has been mentioned as above. Since the supervisory program 114 prompts the user according to the above prompting function, the agendum to be proceeded by the user will not be delayed.

In the above embodiment, the supervisory program 114 prompts the user for two times because a first ahead prompt time duration information and a second ahead prompt time duration information are received during the prompt setting task. Consequently, the supervisory program 114 prompts the user for the corresponding number of times. However, if the first application program 111 is closed after the first prompting action and before the second prompting action, the supervisory program 114 will not prompt the user for the second time. The above contents of the agendum content information, the occurrence time point information and the ahead prompt time duration information are presented herein for purpose of illustration and description only.

Figure 5A:
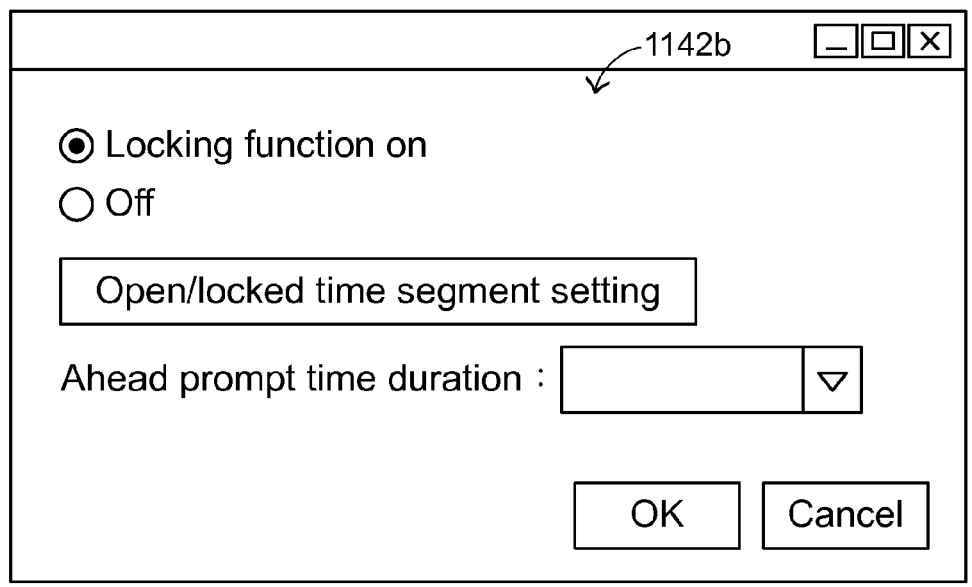
FIGS. 5A and 5B schematically illustrate the lock setting field of the operating time supervisory system according to the embodiment of the present invention.
Figure 5B:
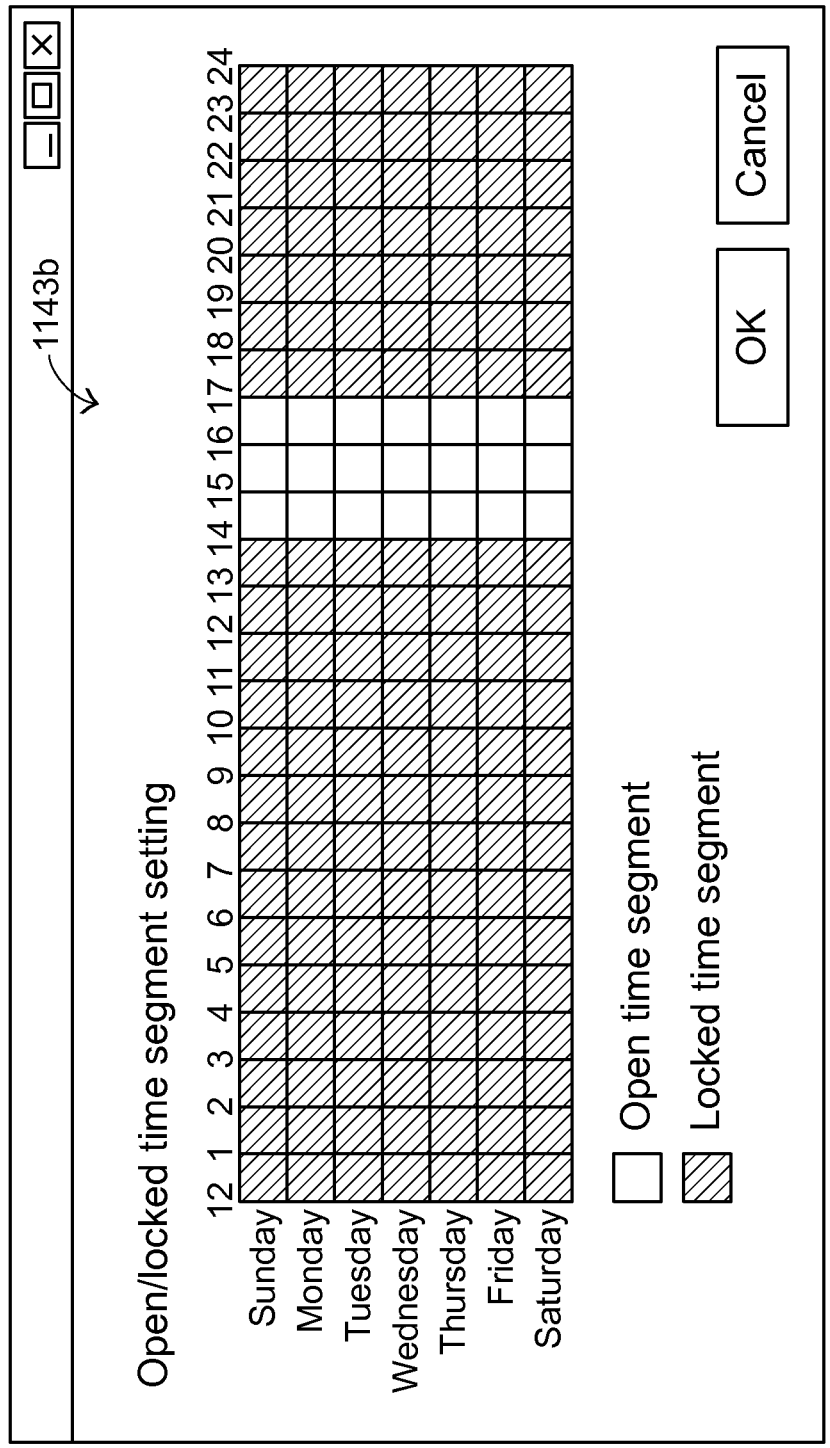

Hereinafter, a process of performing the lock setting option by the supervisory program 114 will be illustrated with reference to FIGS. 1, 2, 5A and 5B. FIGS. 5A and 5B schematically illustrate the lock setting field of the operating time supervisory system according to the embodiment of the present invention. When the user selects the supervisory setting option 115 via the first input interface 131, the computer host 11 activates the supervisory setting option 115, so that the setting interface 1141 is shown by the supervisory program 114. After the user selects the lock setting option 1141*b* of the setting interface 1141 via the first input interface 131, the lock setting field 1142*b* is shown by the supervisory program 114. As shown in FIG. 5A, the lock setting field 1142*b* contains a locking function on option, a locking function off option, an open/locked time segment setting option and an ahead prompt time duration field. The ahead prompt time duration field is similar to that shown in FIGS. 3A~3C. If the locking function on option is selected, the locking function of the supervisory program 114 is enabled. When the locking function is enabled, the all application programs belonging to the supervisory list L of the supervisory program 114 are allowed to be activated during the locked time segments. Whereas, if the locking function off option is selected, the locking function of the supervisory program 114 is disabled. In an implementation example of the locking function, children are allowed to use some specified application programs during the open time segments but are not allowed to use these application programs during the locked time segments. Moreover, after the open/locked time segment setting option is clicked, the supervisory program 114 defines the open time segment or the locked time according to the settings of the user. The function of the ahead prompt time duration information is identical to that mentioned above, and is not redundantly described herein.

In FIG. 5B, an open/locked time segment setting field 1143b is shown. The open/locked time segment setting field 1143b contains the days from Sunday to Saturday and the time points from 0:00 to 24:00, which can be determined according to the user's requirements. In the open/locked time segment setting field 1143b, the locked time segments are marked by oblique lines, and the open time segments are indicated by blank regions. For example, as shown in FIG. 5, the open time segments are from 14:00 to 17:00 every day. That is, the start open time point in every day is 14:00, and the end open time point in every day is 17:00. According to the relationship between the current time point, the start open time point and the end open time point, the supervisory program 114 judges whether the current time point is within the open time segment.

If a child operates the first input device 13 to open the first application program 111 within the open time segment, the first application program 111 is opened in the computer host 111 in response to the operation of the child. Once the supervisory program 114 detects that the first application program 111 is opened, the supervisory program 114 controls the computer host 111 to suspend the first application program 111. Moreover, according to the start open time point and the end open time point received from the open/locked time segment setting field 1143b and the current time point, the supervisory program 114 judges whether the first application program 111 is allowed to be executed in the computer host 111. Since the current time point is within the open time segment, the supervisory program 114 judges that the current time point is between the start open time point and the end open time point and allows the computer host 11 to open the first application program 111. Consequently, the first application program 111 can be used by the child.

While the first application program 111 is opened, the supervisory program 114 enables the prompting function, which is identical to that mentioned above. That is, the supervisory program 114 starts to calculate the operating time of the first application program 111. If the supervisory program 114 judges that the first application program 111 is still operated at the prompt time point, the current operating time is displayed on the computer screen 12 for the display prompt time interval under control of the supervisory program 114. Moreover, as shown in FIG. 4, the operating time is positioned over a part of the operating picture corresponding to the first application program 111. As shown in FIG. 4, the first application program 111 is a racing game program. In another embodiment, a residual use time information to the end open time point is displayed on the computer screen and located beside the operating time in order to further prompt the child. The residual use time information is a time length from the prompt time point to the end open time point. If the child disregards the prompted operating time and continuously operates the first application program 111, when the current time point reaches the end open time point, the supervisory program 114 controls the power control module 132 to stop providing electricity to the first input device 13. Consequently, the first input device 13 is locked, and the child cannot continuously operate the first application program 111. For unlocking the first input device 13, the user may issue an unlocking signal to the supervisory program 114 via the second input device 14. For example, the unlocking signal is generated by inputting a composite key instruction (e.g., the instruction of plural keys Ctrl, A, B and C). In response to the unlocking signal, the supervisory program 114 controls the power control module 132 to provide electricity to the first input device 13.

If the child operates first input device 13 to open the first application program 111 within the locked time segment, the first application program 111 is opened in the computer host 111 in response to the operation of the child. Once the supervisory program 114 detects that the first application program 111 is opened, the supervisory program 114 controls the computer host 111 to suspend the first application program 111. Moreover, according to the start open time point and the end open time point received from the open/locked time segment setting field 1143b and the current time point, the supervisory program 114 judges whether the first application program 111 is allowed to be executed in the computer host 111. Since the current time point is not between the start open time point and the end open time point (i.e., within the locked time segment), the supervisory program 114 controls the computer host 11 to close the first application program 111. In an embodiment, the supervisory program controls the power control module to stop providing electricity to the first input device. Consequently, the first input device 13 is locked.

Figure 6:
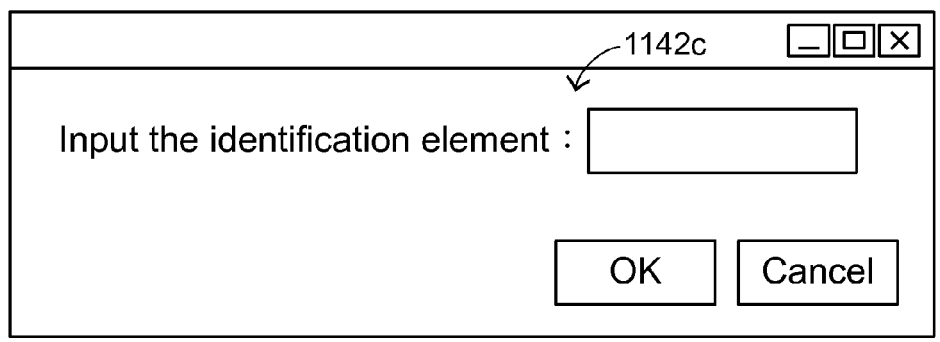
FIG. 6 schematically illustrates the connection establishing setting field of the operating time supervisory system according to the embodiment of the present invention.

In the above embodiments, the operating time supervisory system 1 has a supervising function, a prompting function and a locking function about the first application program 111 and the application programs corresponding to the supervisory list L. Moreover, the user can add the required application programs to supervisory list L according to the practical requirements of the user. FIG. 6 schematically illustrates the connection establishing setting field of the operating time supervisory system according to the embodiment of the present invention. Please refer to FIGS. 2 and 6. When the user selects the supervisory setting option 115 via the first input interface 131, the computer host 11 activates the supervisory setting option 115, so that the setting interface 1141 is shown by the supervisory program 114. After the user selects the connection establishing setting option 1141c of the setting interface 1141 via the first input interface 131, the connection establishing setting field 1142c is shown by the supervisory program 114. After the identification element of the newly-added application program is inputted into the connection establishing setting field 1142c, the new identification element is acquired by the supervisory program 114. Consequently, the supervisory program 114 is connected with the corresponding application program, and this application program is added to the supervisory list L. In other words, the operating time supervisory system 1 of the present invention can achieve the prompting function and the locking function about the supervised application program.

From the above descriptions, the present invention provides an operating time supervisory system. A supervisory list is previously defined in a supervisory program. When an application program in the supervisory list is opened, the supervisory program detects that the application program is opened and starts to count time. Consequently, the supervisory program prompts the user at the proper prompt time point. Moreover, a locked time segment is defined in the supervisory program. Within the locked time segment, children are not allowed to execute the application program, and the input device is not powered. In other words, the operation of the application program is interrupted compulsively. In comparison with the conventional technologies, the operating time supervisory system of the present invention does not need to detect whether anyone uses the input device. Consequently, the erroneous judgment caused by the error detection will be avoided. Moreover, the operating time supervisory system of the present invention can stop providing electricity to the input device and control the computer host to close the application program. Consequently, even if the input device which is not powered is replaced with a new one by the child, the application program cannot be continuously operated.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all modifications and similar structures.

What is claimed is:

1. An operating time supervisory system, comprising:
   a computer host, wherein an application program and a device driver are installed in the computer host, and the device driver contains a supervisory program, wherein when the application program is opened in the computer host, the supervisory program recognizes the application program and starts to calculate an operating time of the application program;
   a computer screen connected with the computer host, wherein an operating picture of the computer host is displayed on the computer screen; and
   an input device connected with the computer host, wherein after the input device is driven by the device driver, the computer host is controlled in response to a user's operation on the input device, wherein if the supervisory program judges that the application program is still operated at a prompt time point, the operating time corresponding to the prompt time point is displayed on the computer screen under control of the supervisory program,
   wherein a supervisory setting option of the supervisory program is displayed on the operating picture of the computer host, wherein after the supervisory setting option is selected, the user is allowed to perform a prompt setting task, a lock setting task and a connection establishing task, wherein after the computer host activates the supervisory setting option, a setting interface is displayed on the computer screen by the supervisory program, and the setting interface contains a prompt setting option, a lock setting option and a connection establishing setting option, wherein when the prompt setting option, the lock setting option and the connection establishing setting option are activated, a prompt setting field, a locking setting field and a connection establishing field are respectively provided, wherein the prompt setting field receive an event occurrence time point information, the locking setting field receives an open time segment information, and the connection establishing field receives an identification element of the application program.

2. The operating time supervisory system according to claim 1, wherein the application program has an identification element, and the supervisory program recognizes the application program according to the identification element, wherein when the application program is opened in the computer host, the supervisory program recognizes the application program according to the identification element of the application program and detects that the application program is opened.

3. The operating time supervisory system according to claim 2, wherein while the application program is installed in the computer system, the supervisory program scans the application program and acquires the identification element, wherein the identification element is an identification code of the application program, a program name of the application program or an installation path of the application program.

4. The operating time supervisory system according to claim 1, wherein after the supervisory program receives the event occurrence time point information, the prompt time point is calculated according to an event occurrence time point and an ahead prompt time duration of the event occurrence time point information, wherein if the supervisory program judges that the application program is still operated at the prompt time point, the operating time corresponding to the prompt time point is displayed on the computer screen under control of the supervisory program, and the operating time is positioned over the operating picture corresponding to the application program.

5. The operating time supervisory system according to claim 4, wherein a display prompt time interval is previously defined by the supervisory program, wherein if the application program is opened in the computer host and the supervisory program judges that the application program is still operated at the prompt time point, the operating time is displayed on the computer screen under control of the supervisory program the operating time corresponding to the prompt time point is displayed on the computer screen for the display prompt time interval under control of the supervisory program, wherein after the display prompt time interval, the operating time corresponding to the prompt time point is not displayed on the computer screen under control of the supervisory program.

6. The operating time supervisory system according to claim 4, wherein the event occurrence time point information contains an additional ahead prompt time duration, wherein the supervisory program calculates and acquires an additional prompt time point corresponding to the additional ahead prompt time duration, wherein if the supervisory program judges that the application program is still operated at the additional prompt time point, the operating time corresponding to the additional prompt time point is displayed on the computer screen under control of the supervisory program and the operating time is positioned over the operating picture corresponding to the application program.

7. The operating time supervisory system according to claim 1, wherein if the supervisory program judges that the application program is opened, the supervisory program controls the computer host to suspend the application program, wherein according to a current time point and a start open time point and an end open time point corresponding to the open time segment information, the supervisory program judges whether the application program is allowed to be executed in the computer host, wherein if the current time point is between the start open time point and the end open time point, the supervisory program allows the application program to be to be executed in the computer host, wherein if the current time point is not between the start open time point and the end open time point, the supervisory program controls the computer host to close the application program.

8. The operating time supervisory system according to claim 7, wherein when the supervisory program allows the application program to be to be executed in the computer host, the supervisory program calculates the prompt time point according to the current time point, the end open time point corresponding to the open time segment information and an ahead prompt time duration, wherein if the supervisory program judges that the application program is still operated at a prompt time point, the operating time corresponding to the prompt time point and a residual use time information are displayed on the computer screen under control of the supervisory program, and the operating time and the residual use time information are positioned over the operating picture corresponding to the application program, wherein the residual use time information is a time length from the prompt time point to the end open time point.

9. The operating time supervisory system according to claim 7, wherein the input device further comprises a power control module in communication with the supervisory program, wherein the power control module controls whether electricity is transmitted to the input interface or not, wherein if the application program is still operated at the end open time point, the supervisory program controls the power control module to stop providing electricity to the input device.

10. The operating time supervisory system according to claim 9, wherein the operating time supervisory system further comprises an additional input device, and the additional input device is connected with the computer host, wherein the additional input device issues an unlocking signal to the computer host in response to a user's operation on the additional input device, wherein the supervisory program controls the power control module to provide electricity to the input device in response to the unlocking signal.

\* \* \* \* \*